(No Model.) 2 Sheets—Sheet 1.

D. TICE.
WHEEL.

No. 292,072. Patented Jan. 15, 1884.

WITNESSES
W. E. Bowen
Chas. R. Burr

INVENTOR
David Tice
By Myers & Co.
Attorneys

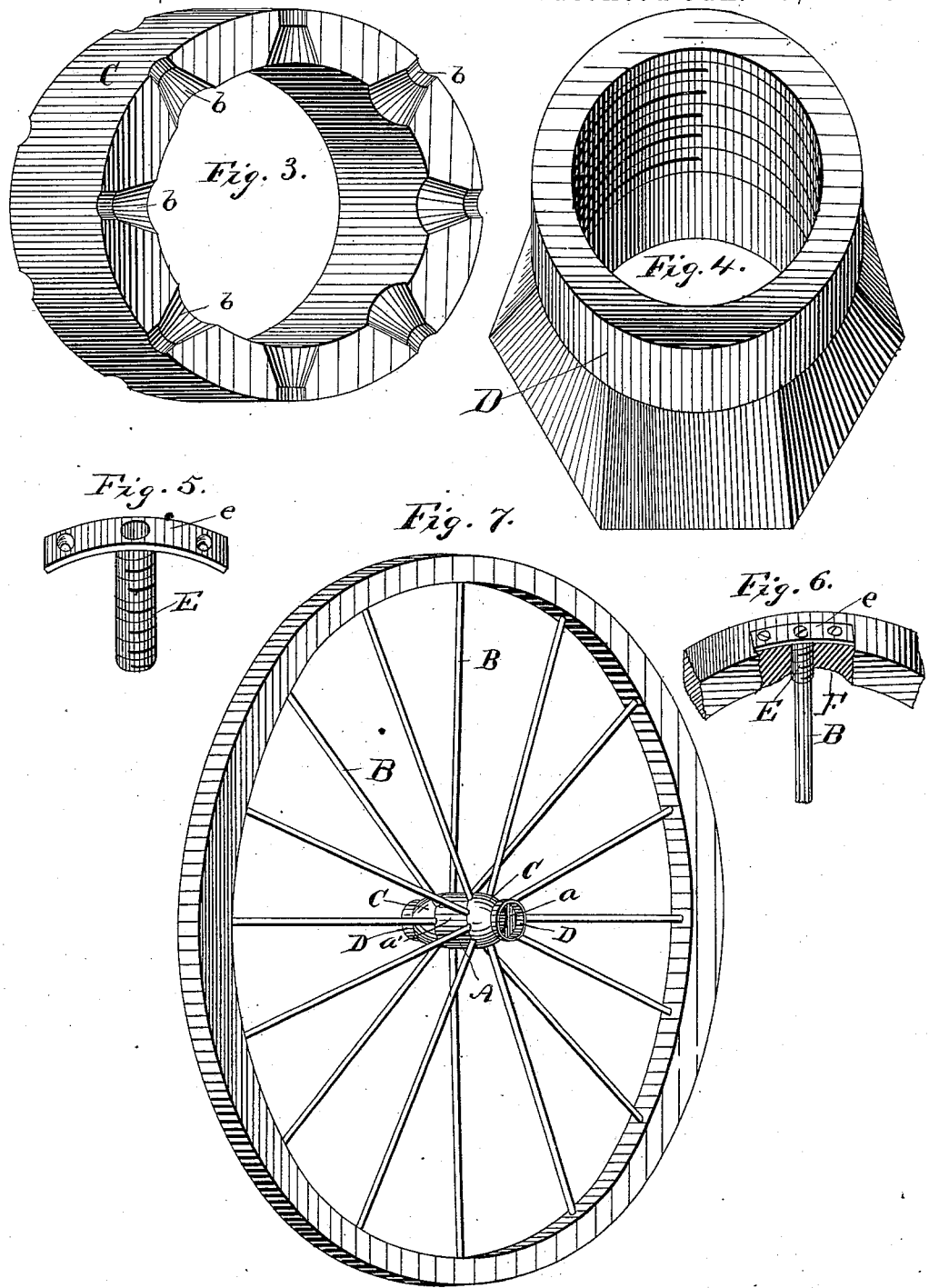

UNITED STATES PATENT OFFICE.

DAVID TICE, OF LOCKPORT, NEW YORK.

WHEEL.

SPECIFICATION forming part of Letters Patent No. 292,072, dated January 15, 1884.

Application filed October 25, 1883. (No model.)

*To all whom it may concern:*

Be it known that I, DAVID TICE, a citizen of the United States of America, residing at Lockport, in the county of Niagara and State of New York, have invented certain new and useful Improvements in Wheels, of which the following is a specification, reference being had therein to the accompanying drawings.

This invention pertains to improvements in wheels, having for its object facility of manufacture, to promote strength and durability, and to enable the ready removal of a defective spoke and the insertion of a new one in its place; and the invention consists of the detailed construction and combination of parts, substantially as hereinafter fully set forth and claimed.

Figure 1:
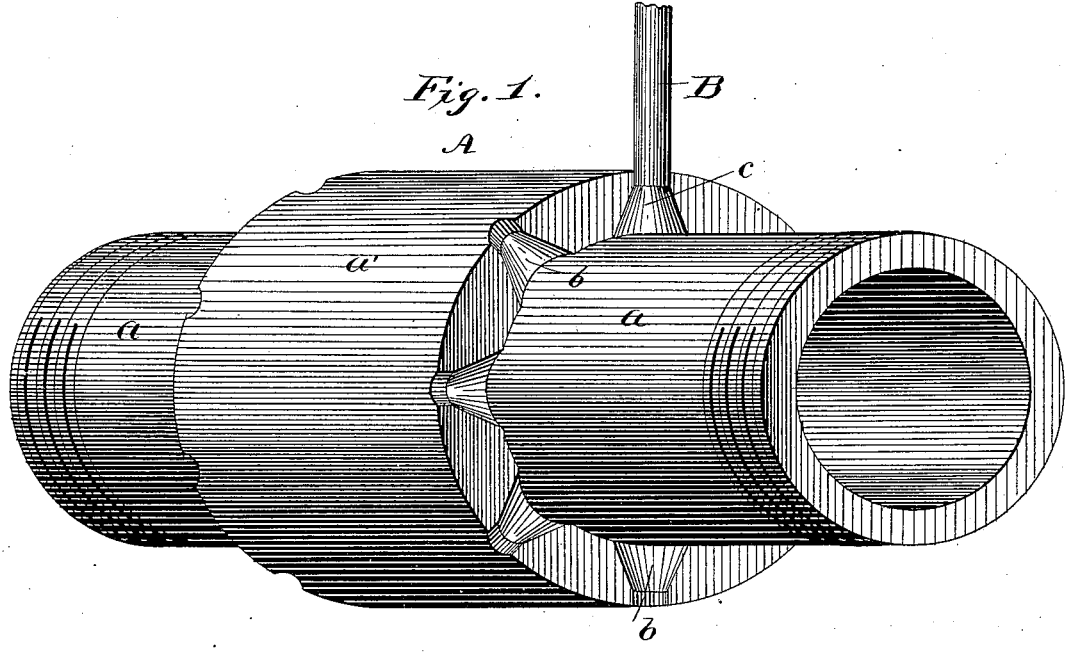
Figure 2:
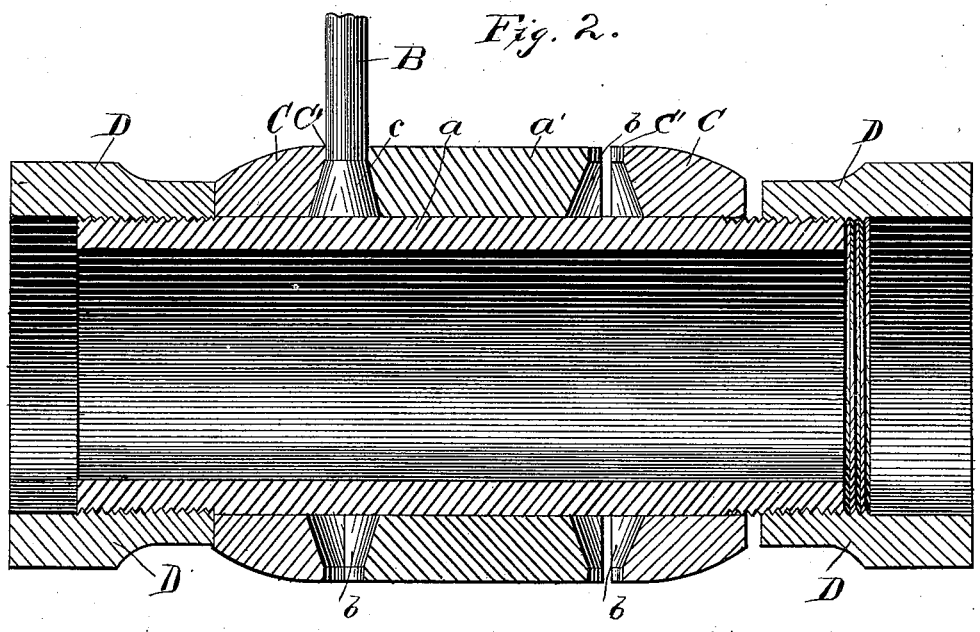

In the accompanying drawings, Figure 1 is a perspective view of the main part of the hub with a spoke in position. Fig. 2 is a longitudinal section of the hub complete, also with a spoke in position. Figs. 3 and 4 are detail views of the hub. Figs. 5 and 6 are detail views of the fastenings for the felly ends of the spokes, and Fig. 7 is a view of the wheel complete.

In carrying out my invention I construct the hub A of cast-iron or other suitable metal, sleeve $a$, with an outer cylindric shoulder, $a'$, arranged about centrally of the sleeve $a$. In each end of the cylindric shoulder is a series of spaced-apart approximately truncated cone or other shaped half-sockets, $b\ b$, to receive coincidentally-shaped shoulders $c$ on the spokes B.

C C are collars or rings, also having half-sockets C', the counterpart of the sockets of the shoulder $a'$, together with which they constitute complete sockets to receive and secure the spokes. The individual spokes of the two series of sockets thus formed alternate with each other, whereby, together with their arrangement at the ends of the cylindric shoulder of the sleeve, such a disposition of the spokes is effected as to impart a double "dish" to the wheel, one on each side, which adds greatly to the strength and durability of the wheel. The collars or rings C C are secured in place by capped nuts D, screwed upon the ends of the sleeve $a$, with their inner ends abutting against the opposite faces of the collars or rings.

The felly ends of the spokes B fit into sleeves E, cast integral with curved plates $e$, which plates are inserted in slight recesses provided on the periphery of the wheel, and each sleeve E is projected through a corresponding orifice provided in a beveled plug which is inserted in the recess F. The plates E are then secured by bolts, which construction enables a broken spoke to be readily removed and replaced without removing the wheel from its axle.

Having thus fully described my invention, I claim and desire to secure by Letters Patent—

1. In a vehicle-wheel, the combination of the sleeve $a$, shoulder $a'$, having sockets $b\ b$, collars or rings C C, having half-sockets C', capped nuts D, sleeves E. for reception of spokes B, and curved plates $e$, substantially as shown and described.

2. The combination of the cast integral sleeve E and plate $e$, the sleeve being inserted in an orificed plug corresponding to recess F, and spokes B and hub A, substantially as shown, and for the purpose described.

In testimony whereof I affix my signature in presence of two witnesses.

DAVID TICE.

Witnesses:
WM. J. LEEKINS,
CHAS. J. MILLER.